United States Patent [19]

Kovalenko

[11] 4,261,442
[45] Apr. 14, 1981

[54] DIAPHRAGM DISC BRAKE

[76] Inventor: Gerald E. Kovalenko, 600 B S.15th St., Arlington, Va. 22202

[21] Appl. No.: 971,732

[22] Filed: Dec. 21, 1978

[51] Int. Cl.³ .............................................. F16D 55/42
[52] U.S. Cl. .................................. 188/18 A; 188/366; 188/71.4
[58] Field of Search .................. 188/18 A, 71.4, 71.5, 188/71.6, 72.4, 170, 366, 367

[56] References Cited

U.S. PATENT DOCUMENTS

| | | | |
|---|---|---|---|
| 2,417,156 | 3/1947 | Dickson | 188/366 X |
| 2,992,705 | 7/1961 | Chisnell et al. | 188/366 X |
| 3,188,922 | 6/1965 | Cruse | 188/170 X |
| 3,830,345 | 8/1974 | Boyles | 188/366 X |
| 4,102,438 | 7/1978 | Rancourt | 188/18 A |

*Primary Examiner*—Duane A. Reger
*Attorney, Agent, or Firm*—Gerald F. Baker

[57] ABSTRACT

A braking system for controlling the rotational motion of one or more rotatable members such as vehicle wheels wherein an annular base member is stationarily mounted with respect to a concentric rotatable axle and a cup shaped drum is concentrically mounted on the axle for rotation therewith and enclosing the brake mechanism. A plurality of slots are formed on a portion of the base member and on the inner edge of the drum. A centrally positioned, split, annular, metallic disc has peripheral fingers directed radially outward to engage the slots on the drum and annular friction members are positioned on either side of this central disc. Each of the friction members has radially inwardly directed fingers for engagement with the slots on the base. The friction members, therefore, are held relatively stationary and the central disc rotates with the axle. The two friction members may be forced against the central disc by means of integral fluid bellows members pressurized from a fluid source under the influence of a master cylinder having a special two stage piston.

9 Claims, 4 Drawing Figures

DIAPHRAGM DISC BRAKE

BACKGROUND

1. Field of the Invention

This invention relates to apparatus for connecting a rotary member to a stationary or rotary member by means of a hydrualically operable friction coupling.

More particularly, this invention relates to a clutch or brake mechanism wherein the connection is made by two opposing annular diaphragm actuators hydraulically clamping an annular connecting member situated between the diaphragm actuators.

The invention is exemplified by a diaphragm disc brake device operated by a dual piston hydraulic braking cylinder.

2. Description of the Prior Art

A revoluable work table has been illustrated and described in U.S. Pat. No. 2,959,988 issued to Clarence D. Abrams Nov. 15, 1960. The work table may be clamped in place in any position by means of opposing diaphragm acutators hydraulically operated to clamp an annular member fixed to the table. The structure is not designed for braking nor used for that purpose, but only for clamping. U.S. Pat. No. 1,909,744, issued May 16, 1933 to R. E. Berg discloses a brake which is operated hydraulically to expand a diaphragm between two toothed brake shoes. The diaphragm and shoes are annular and when fluid pressure is applied the brake shoes act on both sides of the enclosing drum. A dual-cylinder hydraulic actuator for automotive brake systems is disclosed by G. T. Randol in U.S. Pat. No. 3,172,265, issued Mar. 9, 1965. The two pistons are not differentially designed but have an equalizer or compensator to assure that equal pressure is provided to each of the front and rear systems respectively.

No system has been found and none is known wherein a high speed rotating member is coupled to another member rotatable or stationary, by means of two opposing diaphragm operated braking members being clamped to a central disc attached to the rotating member.

Also, no dual acting fluid brake cylinder has been found which delivers a first large volume surge followed by a small volume, high pressure, braking force.

SUMMARY

According to the present invention, two full annular friction members are utilized to provide uniform force distribution over a greater braking surface, resulting in large breaking torques without power assist while preserving the direct feel and control of the braking action for improved control and safety. The two friction members are held nonrotatable by a fixed base member and are forced against a central disc coupled to the rotatable axle by cooperative surfaces on the disc and inside a cup-shaped drum fastened to the axle. The drum, in cooperation with the base member, forms an enclosure which provides environmental protection for the enclosed braking mechanism.

The friction members are forced against the rotatable disc by means of annular bellows members which are fluid expandable under the influence of a two-stage-piston master cylinder.

Initial travel of the piston assembly provides large volume displacement and secondary movement provides maximum force.

The accompanying descriptions and illustrations provide for ways and means for understanding the objects of the invention and how they may be accomplished by typical structures and mechanisms.

DETAILED DESCRIPTION

Figure 1:
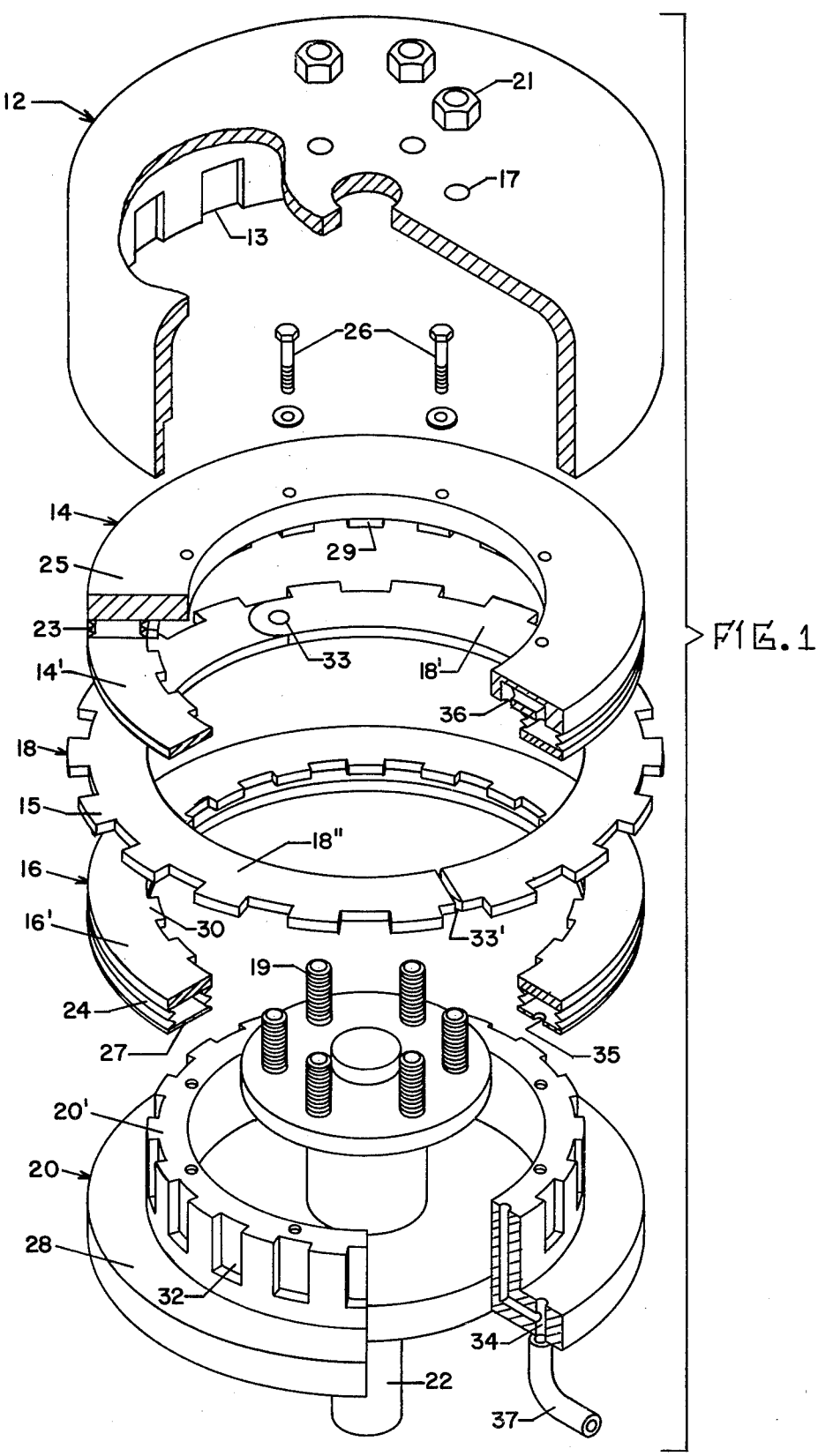
FIG. 1 is an exploded view of a brake mechanism according to the present invention with parts broken away and sectioned for clarity.

In FIG. 1, the following parts are shown in spaced relation to one another: the drum 12, the friction assemblies 14, 16, the braking disc 18, the base member 20 and the axle 22.

The drum 12 is furnished with slots 13 to receive complementary fingers 15 formed on the periphery of disc 18 and is shown perforated at 17 to receive studs 19 on axle 22 for fastening drum 12 to axle 22 by means of nuts 21. The disc 18, therefore, rotates with the drum 12 and axle 22.

Two friction members 14', 16' are fitted with integral bellows or diaphragms 23,24 respectively. Bellows 23 is also integral with an attachment plate 25 adapted to be fastened to the top portion 20' of base member 20 by means of screws 26. The bellows 24, associated with friction member 16', is integral with an opposing flat plate 27 adapted to rest upon or be fastened to a flange 28 on base member 20.

Friction members 14',16' each have inwardly extending radial fingers 29,30, respectively to key the respective parts to slots 32 in the cylindrical portion 20' of base 20. The friction assemblies 14,16 are thus held stationary with respect to base member 20.

Disc 18 is shown in two sections 18', 18" hinged at 33 with the free ends separated by a leaf spring 33'. This permits the disc 18 to be replaced without dismantling the friction assembly 14 from base member 20.

Fluid is supplied to the bellows members 23,24 through passageway 34 in base member 20, which passageway is in communication with passageways 35 and 36 in bellows members 24 and 23 respectively when the mechanism is assembled. Passageway 34 is supplied with fluid from the master cylinder (FIGS. 2–4) through tube 37.

Figure 2:
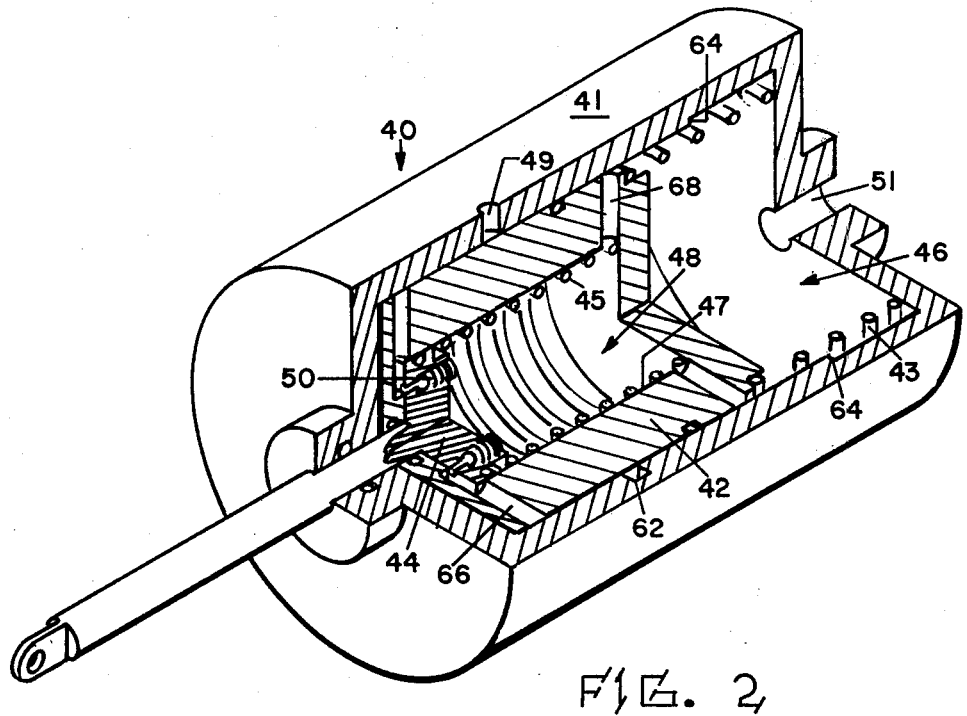
FIG. 2 is an isometric quarter sectional view of a fluid cylinder and piston arrangement usable with the mechanism of FIG. 1.
Figure 4:
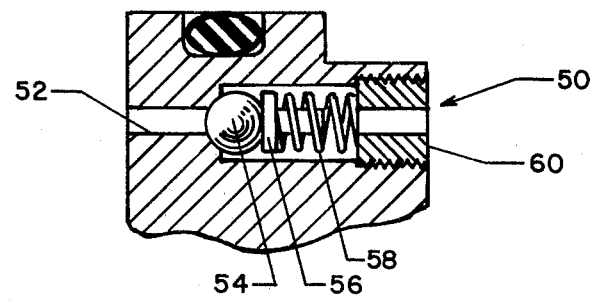
FIG. 4 is a detailed sectional view taken along line IV—IV of FIG. 3.
Figure 3:
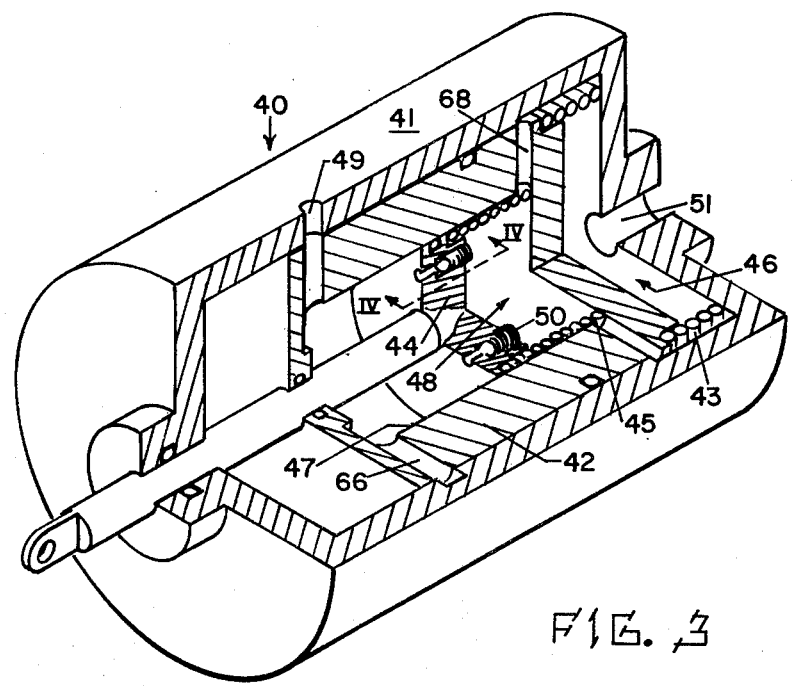
FIG. 3 is a view similar to FIG. 2 with the pistons in the cylinder moved to their extreme actuation position.

A dual piston fluid cylinder assembly 40 is illustrated in FIGS. 2–4 for providing displacement fluid and pressure for braking force in the brake assembly of FIG. 1. A cylindrical housing 41 contains two concentric nesting pistons 42, 44. Piston 42 forms with cylinder 41 a first chamber 46 and provides a cylinder 47 for piston 44. Cylinder 47 and piston 44 form a second chamber 48. Piston 42 is biased to the extreme position shown in FIG. 2 by a return spring 43 and piston 44 is similarly biased by spring 45.

Fluid is allowed to enter the cylinder housing 41 through the port 49 and thence into chamber 48 through valves 50 as will be further explained below. Fluid is forced out of the cylinder housing to the brake actuating diaphragms (bellows) 23,24 through the port 51. Valve 50, shown in detail in FIG. 4, is a simple one-way valve comprising a duct 52 closed by a ball 54 with bias from a plunger 56 under the influence of compression spring 58. The parts are held in place in duct 52 by a hollow screw 60.

Housing 41 has its inner surface relieved by a narrow annular channel 62 and an end channel formed after a step 64. The body of piston 42 has a plurality of passageways 66 at one end communicating with channel 62 and a like plurality of passageways 68 communicating with the end channel after step 64 when the piston 42 is at the limit of travel against the bias of spring 43 (FIG. 3). At this time, one of the passageways 66 is in communication with the port 49 through which replacement fluid may flow by gravity into the cylinder from a conventional reservoir (not shown).

OPERATION

The braking action begins when fluid is forced through passage 37 and expands bellows 23 and 24 in assemblies 14 and 16 respectively. This causes surfaces of friction members 14', 16' to apply force to both sides of disc 18. The fingers 29 on disc 14' keep assembly 14 from rotating and the braking torque is transmitted to drum 12 through slots 13 and thence to axle 22.

The dual-piston cylinder (FIGS. 2 and 3) provides displacement fluid and pressure for the braking force via the brake assembly (FIG. 1). The dual piston cylinder is in the initial position as shown in FIG. 2. Chambers 46 and 48 are full of fluid. As piston 42 is moved to the right, fluid is forced out of chamber 46 through fluid passage 51 and displaces the bellows 23 and 24 (FIG. 1) until friction members 14' and 16' are in contact with rotating braking disc 18. When the dual-piston assembly has moved so that fluid passage 68 is beyond step 64, compression spring 43 is compressed and large piston 42 is stopped. The alignment of fluid passage 68 beyond step 64 allows fluid to flow from chamber 48 into chamber 46 via fluid passage 51, to the bellows 23,24. The fluid volume displaced by the large piston 42 has brought braking members 14',16' into contact with disc 18. Now as the large piston 42 stops and fluid is allowed to flow from chamber 48, the small piston 44 provides the remaining fluid displacement and pressure to the bellows. This applies the braking force to the rotating disc 18.

The dual-piston cylinder assembly is shown in the extended position in FIG. 3. This aligns fluid passages 49 and 66 which allows cylinder 41 to gravity-fill with fluid from a reservoir (not shown). As piston 44 moves to the left, the fluid is allowed to pass into chamber 48 via the directional flow control valve 50 illustrated in FIG. 4. The fluid is not allowed to flow out of cylinder 41 via fluid passage 49 because fluid passages 66 and 49 are not aligned as the dual-piston assembly is moving to the left. The amount of fluid that flows into cylinder 41 when fluid passages 66 and 49 are aligned is the exact amount that is used out of chamber 48 during the braking action. As pistons 42 and 44 are returned to the position shown in FIG. 2, the fluid in cylinder 41 is transferred into chamber 48 via the directional control valve 50 and always allows small piston 44 to return to the position shown in FIG. 2. This provides the necessary fluid volume for the next braking action.

The displacement of the large piston chamber 46 is sized to match the initial volume required to displace the bellows (FIG. 1) until the braking surfaces of discs 14', 16' are in contact with disc 18. The displacement of the small piston chamber 48 provides any make up fluid and the braking force. When the dual-piston assembly retracts, it only allows the amount of fluid in chamber 46 to flow back to the cylinder because fluid passages 68 are moved away from step 64. This provides for an automatic adjustment by only allowing braking surfaces of discs 14',16' to separate the distance allowed by the volume displacement of chamber 46.

The present invention provides for optimum use of braking surface area in a braking system through the use of multiple discs to meet the required braking torque; thus, a uniform braking force can be applied. In addition, this invention provides a low pressure-to-high braking feature which eliminates the need for power assist (in autos, for example) and provides more direct control and feel of the braking action, thus improving control of the vehicle and safety of the driver. The present disc brake is enclosed in a protective drum in order to minimize environmental damage or wear to the brake assembly.

Another application of the present invention might be as a hydraulic clutch to provide a coupling between an engine and power train, such as in a self propelled vehicle.

I claim:
1. A vehicle brake mechanism or the like including:
a rotatable axle;
a cup shaped drum having a substantially closed end removably, concentrically mounted on said axle and an open end;
an annular base member concentrically and non-rotatably disposed with respect to said axle and drum;
said base member having a radial flange portion closely received in said open end of said drum and an axial cylindrical portion extending within said drum;
a flat annular disc with a central opening of sufficient size to allow free rotation around said cylindrical portion of said base member;
two annular friction members one on either side of said flat annular disc and having an outside diameter such as to allow free rotation within said drum and having contoured inner edges adapted to slidably and non-rotatably fit on said cylindrical portion of said base member;
said flat annular disc being slidably fixed within said drum for rotation therewith between said two friction members; and
means for forcing said friction members toward each other to frictionally engage said flat disc.

2. A brake mechanism according to claim 1 wherein said means for forcing said firction members include annular fluid bellows means fixed on one side to each said friction member and having the other side secured against axial movement with respect to said base member.

3. A brake mechanism according to claim 2 wherein said radial flange portion and said cylindrical portion of said base member include ports communicating with each said bellows members and adapted to be connected to a supply of fluid.

4. A brake mechanism according to claim 1 wherein said friction members each include fluid pressure means.

5. A brake mechanism according to claim 4 wherein said base member includes passageways connecting with said fluid pressure means and adapted to be connected to a source of fluid pressure.

6. A brake mechanism according to claim 5 and said source of fluid pressure including a dual piston fluid cylinder mechanism comprising a first hollow cylindrical piston fitted within said fluid cylinder and adapted to provide initial displacement fluid to said fluid pressure means and a second piston within said first piston adapted to apply a final greater force thereto.

7. A brake mechanism according to claim 5 wherein said source of fluid pressure comprises a fluid pressure device adapted for manual or pedal operation including:
   a housing having a first cylindrical inner chamber;
   a first piston within said chamber and having a second cylindrical chamber;
   a second piston within said second cylindrical chamber;
   an operating rod connected to said second piston;
   a first port in said housing for supplying fluid to said second chamber; and
   a second port in said housing for egress of fluid upon movement of said rod for actuation of said pistons;
   whereby travel of said first piston supplies a greater quantity of fluid under less force and travel of said second piston supplies less fluid with greater force.

8. A brake mechanism according to claim 1 wherein said flat annular disc comprises two semi-disc portions hinged together to facilitate removal and replacement.

9. A brake mechanism according to claim 4 wherein said fluid pressure means include annular bellows means fixed on one side to each said friction member and having the other side secured against axial movement with respect to said base member.

* * * * *